Patented July 18, 1933

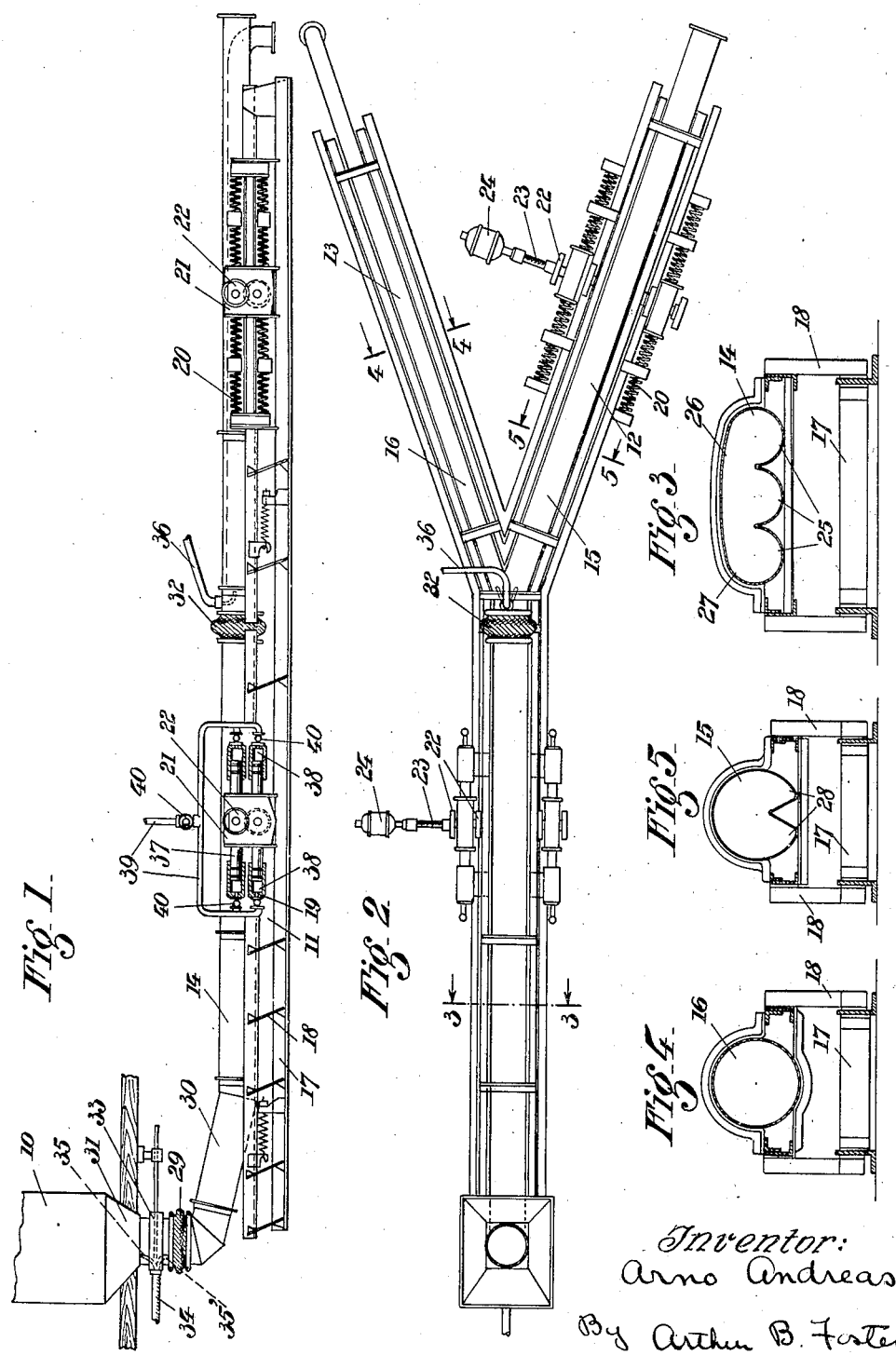

1,919,086

UNITED STATES PATENT OFFICE

ARNO ANDREAS, OF MUNSTER IN WESTFALEN, GERMANY

JIGGING CONVEYER

Application filed November 14, 1929, Serial No. 407,237, and in Germany November 16, 1928.

This invention relates to jigging conveyers in which the conveying trough constitutes an oscillatory structure having a high period of oscillation, that is to say, it oscillates at above 500 periods per minute, frequently even at 1000 periods per minute, and even at a higher speed of oscillation.

One object of the invention is to render jigging conveyers of this character suitable for conveying very fine, powdered or flour like material. Whereas, the usual jigging conveyers which oscillate below the periods above specified are capable of conveying flour like or powdered material equally as efficiently as lumpy materials, it has been found that jigging conveyers having a high frequency of oscillation of the troughs, and which are of the usual construction are not capable of conveying powdered material. This is essentially due to the fact that the flour like or powdery material is yielding in its layer located on the trough so that the very rapid vibrations of the bottom of the trough are destroyed in the thickness of layer of the flour like or powdery material.

Whereas, it was not possible hitherto to convey flour like or powdery material by means of conveying troughs oscillating at a high frequency this is rendered possible in accordance with the invention in a surprising manner if the conveying is effected by means of a trough having a closed cross section. In this case the air located above the layer of the material to be conveyed, and which also partakes of the vibrations, takes part in the conveying and drives the material to be conveyed forwardly.

In the usual slowly moving troughs a trough body of closed cross section does not in fact promote the quantity of material conveyed, but on the contrary deteriorates this by reason of the greater friction. At the most it obviates the development of dust in the case of powdery material. Whereas in the case of low frequency jigging conveyers the use of a conveying trough with a closed cross section is not necessary and is mostly undesirable, a trough of closed cross section in the case of high frequency conveying troughs becomes an absolute requirement for the conveying of powdery material.

A further object of the invention resides in imparting the most suitable shape to the closed trough section adapted to the conditions of conveying. As the air plays an important part in the conveying the trough cross section is preferably such that the air gains complete access to the layer of material located underneath it. When conveying large quantities it is preferably advisable to use a plurality of closed troughs arranged parallel to one another, but which may also be combined as a single trough with a common air space, preferably as a single trough consisting of one or more, more or less, shallow gutters or a trough having a cross section which at least is reduced towards the bottom. Further it is also preferred when using a number of jigging conveyers operating in succession to form the connection together of the conveying troughs and also the connection to the charging hopper for the material, the silo or the like, airtight and resilient. Into the hopper, bunker, silo or the like there is forced, preferably at the discharge point, air which not only renders the material to be conveyed more fluid, but also replaces the air carried away in the closed trough by the material by being moved with the material.

A still further object of the invention resides in providing a suitable spring support for the high frequency oscillating structure. By reasons of the very low limit of fatigue of the springs, particularly of spiral springs, the material of the springs cannot by far be completely utilized as compared with the power strain which the springs could withstand statically. According to the invention a considerable improvement may be made in this respect, if instead of the springs there are used gaseous elastic means, for example, known air buffers, as spring supports for the high frequency oscillating structure.

In the accompanying drawing is illustrated an example of construction of a conveying plant according to the invention in which high frequency jigging conveyers are used for conveying fine material.

Fig. 1 is an elevation of a jigging conveyer of the type herein described.

Fig. 2 is a plan view of the conveyer shown in elevation in Fig. 1.

Figs. 3 to 5 are cross sectional views taken to show particularly the various forms of the trough, Fig. 3 illustrating a three compartment trough with a common chamber located above, Fig. 4 illustrating a single chamber trough which is circular in cross section and Fig. 5 illustrating a trough having two compartments in the lower part thereof.

The plant illustrated for conveying fine, flour like or powdery material, is provided with a hopper, bunker, silo or the like 10 of any suitable character, from which the material is conducted to a jigging conveyer plant which, in the example of construction illustrated, is divided into a number of separate conveying troughs arranged one behind the other by reason of its great length. The drawing also indicates that the stream of the material delivered by the first portion 11 of the jigging conveyer, is divided at the end of the latter into two or more conveying streams, which may have a different size and direction in order to deliver the material at different points.

Each jigging conveyer portion 11, 12, 13 includes one or more conveying troughs 14, 15, 16 which are supported on their base 17 by weak supports 18 or the like so as to eliminate the transmission of vibration to the base. The supports 18 are preferably only of such strength as will adequately support the trough member. The trough which is mounted in this manner is adapted to rock freely above the base 17 and is connected to a spring device 19 or 20 of such strength that the mass of the trough 14, 15 or 16 together with the corresponding spring device 19 or 20 and the reaction mass 21 forms an oscillatory structure having a high natural period of oscillation, that is to say, a frequency above 500 oscillations per minute. The reaction mass 21 is mounted so as to be adapted to oscillate freely in the direction of conveying. The high frequency oscillating structure may be driven or actuated in any suitable manner. The driving mechanism is preferably connected to the reaction mass 21. It may, for example consist of unbalanced masses 22 which are rotated by a motor 24 by means of a flexible shaft 23.

The conveying of powdery material by means of a high frequency jigging conveyer is rendered possible, according to the present invention, by providing the conveying troughs 14, 15, 16 of closed section along their entire length, that is to say, making them tubular.

For this purpose the trough, as shown in Figure 4, may have a circular cross section, but it may also have a section other than circular which is frequently more suitable. The width of the cross section is preferably reduced towards the bottom. For example, for the purpose of conveying large quantities the tubular cross section may be divided into a plurality of sections which are either separate or connected together in any suitable manner. A preferred cross section of this character is shown in Figure 3. In this case the trough consists of a plurality, for example three, of similarly shaped compartments 25 which are closed by a common covering wall 26 so that the three similarly shaped compartments 25 are provided with a common air chamber 27. Another suitable cross sectional shape is shown in Figure 5. The trough 15 is reduced downwardly, two trough parts 28 which become more pointed towards the bottom being provided.

The connection of the trough both to the charging hopper 10 and also to the troughs, which are connected thereto, is preferably closed and is more or less flexible. Thus, for example, such flexible means, for example, in the form of bellows, are arranged at 29 between the hopper 10 and the supply pipe 30 connected to the first trough body 14. Corresponding flexible means 32 connect the first trough body 14 to the succeeding ones, Figure 2 particularly showing that for example at this point the trough section can be sub-divided and continued as two separate troughs 15, 16 of closed section which are conducted in any suitable direction and, as will be seen from the cross sections, Figures 4 and 5, may be provided of any suitably large and differently shaped cross sections.

It is advisable to supply air by means of a suitable device adjacent the inlet 29, 30 or to the outflow pipe 31 of the charging hopper 10. For example, an air supply pipe 34 may be provided at or in the discharge slide 33, which is preferably adjustable, the nozzle of the air supply pipe, as illustrated at 35 or 35' being located either opposite to or in the same direction as the direction of conveying. The air supplied prevents collections of material and stoppages in the supply pipe and renders the supply more uniform. Such air supplies may also be provided at other points of the conveying plant as indicated at 36, for example at the commencement of each succeeding trough.

It is advisable in many cases to replace the strong springs 20, which are necessary for obtaining the high frequency of the oscillating trough, by other means, for example cylinder bodies 19 which are filled with a compressible material such as air. This medium acts on pistons 37 which are for example connected to the reaction mass 21, whilst the cylinders are mounted directly or indirectly on the trough body 14.

The compressible medium located in the cylinder chamber 38 plays the part of the springs. In order to enable the spring action of the buffers to be regulated within wide limits the cylinder chamber 38 may be supplied with compressed air or the like by means of pipes 39 which are adjustable at 40. The controlling valves 40 may also be combined with non-return valves. According to the pressure existing in the cylinder chambers 38 the spring action of these buffer devices may be arranged to suit the masses of the oscillating structure so that only one construction of the buffer device is necessary for all methods of conveying, the oscillating properties of the buffer devices being adjustable for the purpose of use by the correct selection of the compression in the buffers. The pipes 39 simultaneously serve to replace the elastic media in the chambers 38 in proportion to its loss during the operation by reason of leakages, and so forth.

As used in the claims, the term "high frequency" signifies a frequency of at least 500 oscillations per minute.

I claim:—

1. A jigging conveyer comprising a conveyer trough adapted to oscillate at a high frequency having a closed cross section along its entire length consisting of a plurality of similarly shaped compartments forming the lower portion of the said conveying trough, while the upper portion of said conveying trough comprises an air chamber common to the similarly shaped compartments forming the lower portion of the said conveying trough, a resilient support for said trough and means for oscillating said trough at a frequency of at least 500 oscillations per minute.

2. A jigging conveyer as set forth in claim 1 in which the conveying trough is composed of a plurality of sections which are connected together at adjacent ends in such a manner that the connections are airtight.

3. In a jigging conveyer a conveying trough of closed cross section and adapted to oscillate at a high frequency, a supply hopper, charging means between said hopper and said trough, and an airtight elastic connection between said hopper and the charging means for the trough.

4. In a jigging conveyer a conveying trough of closed cross section and adapted to oscillate at a high frequency, a supply hopper, charging means between said hopper and said trough, and an airtight elastic connection between said hopper and the charging means for the trough, and adjustable means for controlling the passage of the material from the hopper to the trough.

5. In a jigging conveyer a conveying trough of closed cross section, branch troughs of closed section communicating with said first mentioned trough and being supplied thereby, all said troughs adapted to oscillate at a high frequency, and airtight connecting means for said troughs.

6. In a jigging conveyer a conveying trough adapted to oscillate at a high frequency, cylinders containing elastic media and forming a resilient support for said trough, pistons mounted in said cylinders, the cylinders being connected to one mass and the pistons to another mass of the oscillating structure containing the trough and a reaction mass.

7. In a jigging conveyer a conveying trough adapted to oscillate at a high frequency, cylinders containing an elastic medium and forming a resilient support for said trough, and means for varying and adjusting the pressure of the elastic medium.

ARNO ANDREAS.